April 6, 1965 K. SCHUHMANN 3,176,397
SKINNING DEVICES
Filed Jan. 10, 1963 2 Sheets-Sheet 2
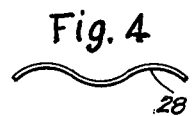
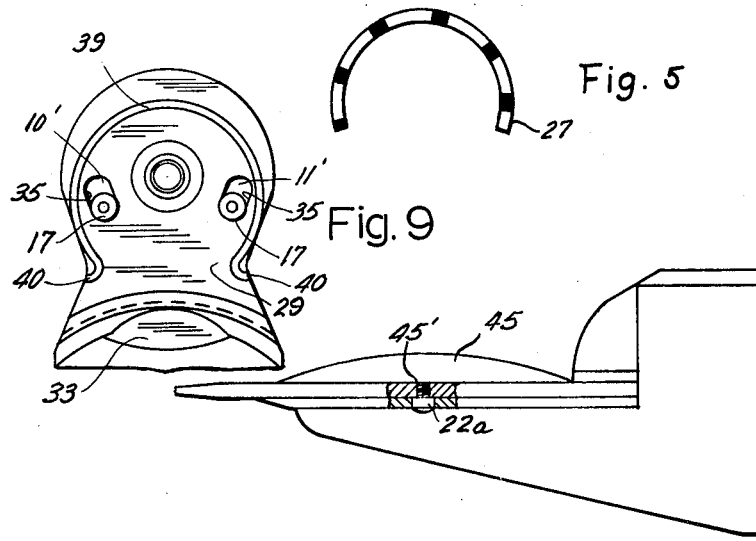
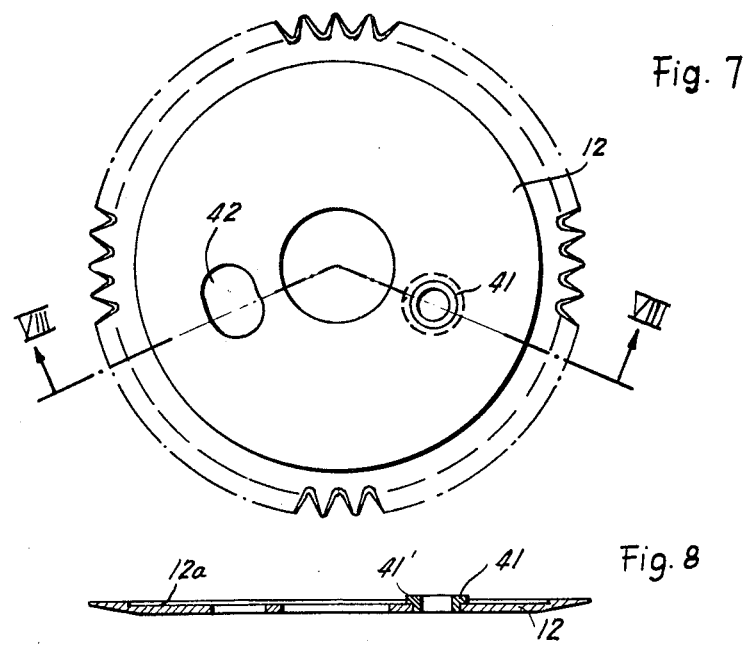
INVENTOR
Kurt Schuhmann
BY Mestern, Ross & Mestern

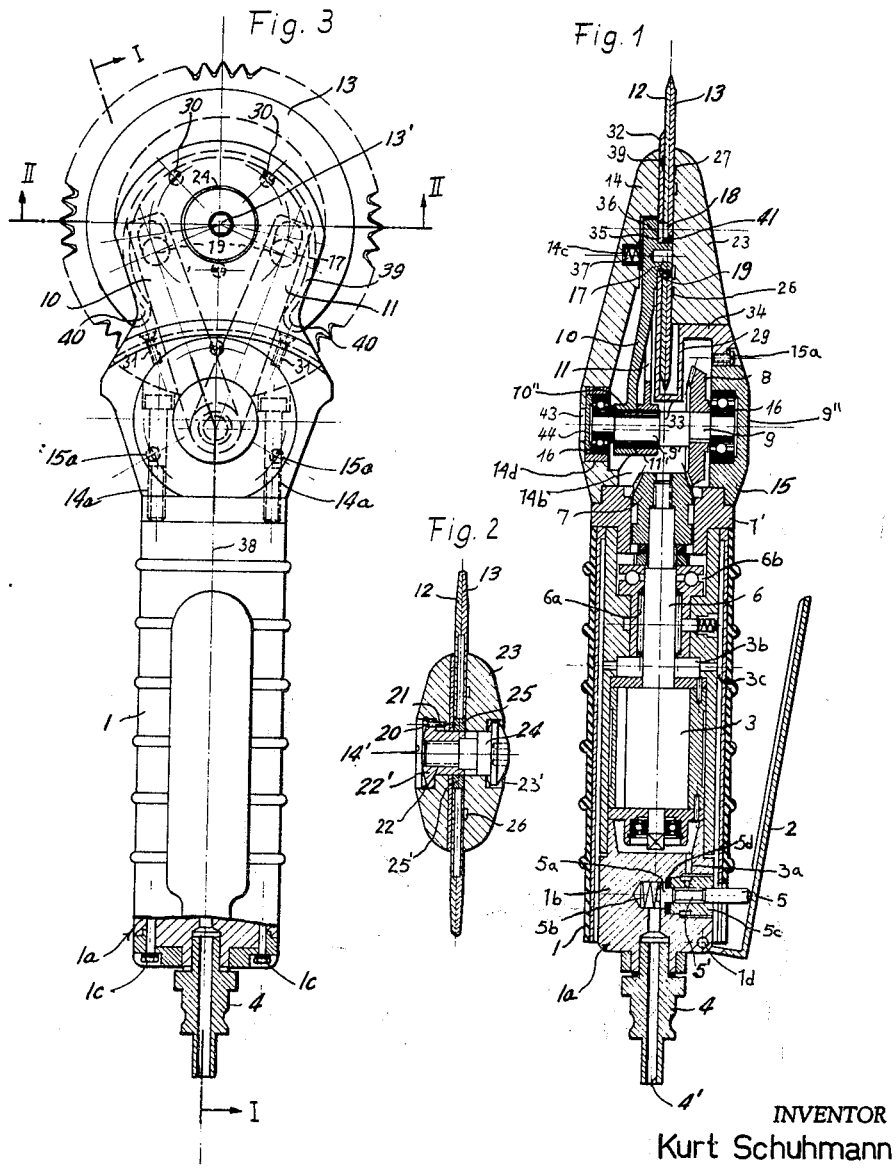

United States Patent Office 3,176,397
Patented Apr. 6, 1965

3,176,397
SKINNING DEVICES
Kurt Schuhmann, Knittlingen, Wurttemberg, Germany, assignor to Schmid & Wezel, Maulbronn, Wurttemberg, Germany, a corporation of Germany
Filed Jan. 10, 1963, Ser. No. 250,638
Claims priority, application Germany, Feb. 22, 1962, Sch 31,030
11 Claims. (Cl. 30—219)

The present invention relates to skinning devices and, more particularly, to appliances for the disintegument of animals and the like by severing their pelts, skins or hides from fleshy portions of the carcasses which can generally be employed in slaughter houses or the like for this purpose.

While many devices of this type are known, it should be noted that, in general, all comprise a pair of relatively reciprocating blades or "separating" members capable of subdividing the dermal layers of the animal from the flesh thereof to enable the skin or pelt to be peeled back and salvaged for further use (e.g. for the production of leather and commercial furs). The drive means for these members, which can be mounted in a hand tool, is generally disposed rearwardly of the blades and provides with a transmission coupled therewith. Work with these devices is characterized by several difficulties primarily arising from the inability to adequately clean and protect the moving parts of the apparatus which are exposed to foreign matter (e.g. blood, fatty acids, hair, fibers and the like) not readily removable except with the greatest care and upon disassembly of the device. Not only do such materials cause the relatively movable blades to adhere together but, in addition, they cause corrosion of these blades, their mounting and the drive transmission. The high corrosive power of slaughterhouse wastes is well known and total deterioration of any bearings, drive linkages and the like in contact with these wastes can take place in a very short time (e.g. in the period of a day or weekend). Earlier devices were also incapable of being readily disassembled to permit adequate cleaning of the moving parts so that early deterioration of the drive motor or transmission and a decrease in the efficiency of the apparatus resulted.

It is an object of the present invention to provide an improved skinning device wherein the aforementioned disadvantages are avoided.

It is a more specific object of the invention to provide a device of this type capable of preventing clogging of its moving parts while being so constructed as to permit ready cleaning and disassembling.

These objects are attained, in accordance with the invention, in a device for the disintegument of animal carcasses which comprises a housing and a pair of blade members extending outwardly from the housing, drive means being provided within the housing for relatively displacing the two members. The drive means is, preferably, totally enclosed within the housing which is designed to overlie the noncutting portions of the blades and is formed with partition means intermediate the blade members and the drive means for preventing access of foreign matter to the latter mechanism. The partition means, which may be composed of a noncorroding material such as stainless steel or Monel metal, is advantageously formed with apertures through which a drive element passes into engagement with one or both of the blade members. Shield means are, however, also provided to block entry via these apertures of foreign matter into an interior compartment within the housing defined by the partition means.

According to a more specific feature of the invention, the blade members may be a pair of separating disks journalled in the housing for relative angular reciprocation about a common axis. The drive means includes a source of motive power and transmission means coupling the disks therewith. The transmission means can comprise a pair of arms each of which is pivotally secured to one of the disks at an eccentric location thereon and is reciprocated by an eccentric or crank. Preferably, the arms are disposed on one side of the partition means remote from the blade disks and are articulated to them symmetrically with respect to a median line through the crankshaft and the axis of rotation of the disks. The latter may thus overlie a portion of the partition means extending perpendicularly to this axis and through which the connecting elements of the arms extend. On the side of these disks opposite the partition means the housing is provided with a removable cover which affords access to the disks and enables their removal.

The shield means, which prevents passage of waste material through the apertures in the partition into the drive compartment, may be formed as surfaces on the transmission arms which overlie the apertures and extend therebeyond. These arms are also so mounted as to be axially displaceable relative to the partition means at least in the region of the shield surfaces while spring means is provided to constantly urge these surfaces axially into sliding engagement with the partition.

Additionally, I prefer to form the partition means with a channel confronting the blade members for diverting liquid wastes away from the interior of the housing. To this end the channel may have an arcuate configuration and partly surround the axis of the blade members for protecting the mounting means therefor from contact with such liquid. The removable cover may, in cases wherein a substantially flat housing is required for fine division of layers, be formed as a bolt with an enlarged flattened head. Furthermore, the removable cover may be provided with resilient means bearing axially upon blades for urging them together. This resilient means may, according to another feature of the invention, comprise a flat undulating member partly received within an annular groove in the cover.

The above and other object features, and advantages of the present invention will become more readily apparent from the following description, reference being made to the accompanying drawing in which:

FIG. 1 is a cross-sectional view taken generally along the line I—I of FIG. 3;

FIG. 2 is a cross-sectional view taken along the line II—II thereof;

FIG. 3 is a plan view of a manually operable disintegument device;

FIG. 4 is a side view of resilient means employed in the device;

FIG. 5 is a plan view of this resilient means;

FIG. 6 is a side view, partly in section, of a modified device;

FIG. 7 is a plan view of one of the blades or separating members employed in the devices of FIGS. 3 and 6;

FIG. 8 is a cross-sectional view taken along the line VIII—VIII; and

FIG. 9 is a plan view of a partition of the device shown in FIG. 3 with the cover plate and blades thereof removed.

In FIGS. 1 through 3 and 9 I show a skinning device comprising a hand grip 1 of nonslip material (e.g. rubber) which surrounds the handle 1a of the device. This handle comprises a cylindrical member 1b fastened to the remainder of the handle by bolts 1c (FIG. 3) into which a bushing 4 for connection to a source of fluid under pressure is threaded. Member 1b also carries a pin 1d upon which a control lever 2 is articulated and bears against a valve controlling the flow of fluid from the inlet bore 4' in the bushing 4 to a fluid operable (e.g. turbine) motor. Valve member 5 carries a head 5a which is biased by a spring 5b against a resilient valve seat 5d held in place by a packing nut 5c. When the control lever 2 is depressed, fluid flows past the annular clearance about the shank 5' of valve member 5 and thence via a bore 3a to the motor 3. Exhausted air or other fluid returns via a chamber 3b and a passage 3c to the atmosphere.

Output shaft 6 of motor 3 passes through a needle bearing 6a, which is held in place by a thrust bearing 6b, terminating in a bevel gear 7. The latter forms with another bevelgear 8 an angular transmission for the source 3 of motive power. Bevelgear 8 is keyed to an eccentric or crankshaft 9 which also carries a pair of transmission arms 10, 11 axially shiftable along the eccenter 9'. Transmission arms 10, 11 are coupled with respective blade disks 13, 12 as will be more readily apparent hereinafter.

The crankshaft 9 is journalled between a pair of roller bearings 16 received in a lower housing portion 14 which is bolted to the handle 1a by cap screws 14a. This lower housing portion includes a plate 15 of generally circular configuration, which is held in place by angularly spaced bolts 15a and is removable to afford access to the transmission means for cleaning of the latter. The arms 10 and 11 are each provided with a connecting element such as the boss 17 which is rotatably linked to one of the blade disks 12, 13. Thus arm 10 extends through a cutout 18 in disk 12 and engages disk 13 while arm 11 has its connecting element 17 directly coupled with blade 12. The arm 10 is offset from arm 11 so that both arms can be substantially coplanar at their junction with the respective blade members even though they originate at axially spaced locations along the crankshaft.

As can be seen in FIGS. 2 and 3, the lower housing portion 14 is provided with a nut 22 whose head 22' is seated within a recess 14'. A split spring ring 20 holds the nut against axial displacement while a pin 21, rigid with this nut, is received within the lower housing portion to prevent angular displacement of the nut. Nut 22 is adapted to receive a cap screw 24 whose Allen head can be countersunk within a recess 23' in a cover plate 23 removably mounted on lower housing portion 14 and overlying the blades 12, 13. The nut 22 also fits into a support ring 25 upon whose periphery 25' the blades 12 and 13 can be press-fitted and which serve as a hub for these blades; the latter are journalled upon ring 25 for relative angular displacement.

Cover plate 23 is formed with an annular groove 26 confronting blade 13 and adapted to receive an annular spring 27, which as can best be seen in FIGS. 4 and 5, is of generally flattened annular configuration. This spring ring 27, which extends only partly into group 26, bears against the blade disks 12 and 13 substantially uniformly about their axis of rotation 13' and urges them together while holding them against withdrawal from the connecting elements 17. The undulations 28 of the spring 27 provides the necessary bias force to hold the blade in cutting relationship. Upon removal of screw 24, the blade 12 and 13 can be readily removed for cleaning.

To prevent entry of foreign matter into the compartment 14b the lower housing portion 14 containing the transmission means, I provide a partition 29 between the blades 12 and 13 and the transmission elements 9, 10, 11 etc. This partition, which can be composed of a noncorroding material such as stainless steel or Monel metal, is secured to the lower housing portion 14 by a pair of screws passing through a flange 34, which tightly abuts the cover plate 23 and a plurality of screws 30 countersunk into the partition so that they can be cleared by blade 12. This partition 29 is formed with a wall portion 32 which extends perpendicularly to the axis 13' of the blade disks 12 and 13 and is parallel thereto while underlying disks 12 in contacting relationship. The wall portion 32 terminates in a transversely extending portion which runs parallel the periphery of the blades with approximately identical radius of curvature while being provided with the aforementioned flange 34. This configuration of the partition wall, which is readily apparent from FIG. 9, affords complete separation of the drive compartment 14b from the blades.

The partition 29 is formed with a pair of elongated slots 35 through which the projecting elements 17 of arms 10 and 11 extend into engagement with the disks 12 and 13. These arms are, however, formed with shield surfaces 10', 11' which slidably engage the inner surface 36 of wall portion 32 of the partition and overlie the apertures 35 to prevent passage of waste material into the compartment 14b. As may be seen in FIG. 1, the hubs 10', 11'' of arms 10 and 11 are axially slidable along the crankshaft 9 and are biased against surface 36 by a pair of springs 37 (only one of which is shown), the springs being received within suitable recesses 14c in the lower housing portion 14. This biasing force is dimensioned to be relatively light so that no substantial friction is encountered by the arms. The locations 19 at which the arms 10 and 11 are joined to the respective disks 13, 12, lie in a plane parallel to the axis 13' of the disks and perpendicular to the centerline 38 which extends in a common median plane of the axis 13' and 9'' of the disks and the crankshaft, respectively. The face of the partition wall portion 32 juxtaposed with disk 12 is formed with an arcuate groove 39 (FIG. 9) which at least partly surrounds the bearing means 25 etc. of the disks and opens along the periphery (e.g. at 40) of the housing to collect and divert liquid waste material such as blood or the like. Such wastes can be carried along the groove 39 by the oscillating motion of disk 12.

As may be seen in FIGS. 7 and 8 each of the blade disks 12 and 13 is provided with a bushing 41 through which the elements 17 of the arms pass and in which they are articulated. The heads 41' of these bushings have a height greater than the depth of the dished portion 12a of the disks and generally equal to a height greater than twice this depth so that they extend into the slots 42 of the open disk. The heads 41' thus constitute additional guides for the angularly reciprocating disks. One of the bearings 16 of the crankshaft 9 is press-fitted into a cap 44, adapted to slip into a recess 14d in lower housing portion, while a bore 43 affords further access to the recess from the exterior. The other bearing 16 is seated in a bearing plate 15 which is affixed to the lower housing portion by screws 15a as previously noted. When it is desired to disassemble the device for cleaning, cover 23 is removed to permit withdrawal of the blades 12 and 13. Subsequently the partition 29 can be unbolted when the plate 15 is removed so that a mandrel, pin or other tool can be inserted through the opening 43 to push the crankshaft 9 axially from the compartment 14b. The arms 10 and 11 can then be slipped off the shaft and cleaned.

When it is desired to employ the device for sensitive work (e.g. in the disintegument of calves or the like), it is important that the upper surface of the housing be as flat as possible. To this end the cover 23 may be replaced by a bolt 45 with an enlarged head whose threaded portion 45' is received in a nut 22a in the same manner as is the screw 24 previously described. Otherwise the devices are identical. The flat and enlarged head of bolt 45 can lie close to the skin to be peeled from the carcass, thereby permitting fine skinning of the animal.

The invention as described and illustrated is believed to admit of many modifications and variations within the ability of persons skilled in the art, all such modifications being deemed included within the spirit and scope of the appended claims.

What is claimed is:

1. A disintegument apparatus comprising a housing; a pair of relatively movable blade members journaled in said housing for relative angular displacement about a common axis; drive means within said housing spaced from said members, said drive means including a source of motive power, and transmission means operatively connecting said members with said drive means; partition means within said housing between said blade members and said transmission means for limiting contact of foreign matter with said transmission means, said transmission means including a crankshaft having an axis parallel to the axis of said members and a pair of arms rotatably mounted eccentrically on said crankshaft and pivotally connected to respective ones of said members at locations thereon offset from the axis of rotation thereof and symmetrically disposed on opposite sides of a plane passing through said axes, said partition means including a first wall portion extending perpendicularly to the axis of rotation of said blade members, said arms being provided with connecting elements extending through apertures provided in said wall portion into engagement with said blade members; and shield means at said apertures for blocking the passage of foreign matter therethrough.

2. An apparatus as defined in claim 1 wherein said arms are disposed along one side of said blade members and said housing comprises a detachable cover overlying said blade members along the side thereof opposite said arms and affording access to said blade members to permit their removal, said housing enclosing at least a central portion of both blade members and being provided with a detachable bearing plate axially aligned with said crankshaft for facilitating the removal thereof.

3. An apparatus as defined in claim 2 wherein said resilient means includes an annular spring of generally flat undulating configuration partly received in a groove formed in said cover.

4. An apparatus as defined in claim 2 wherein said cover constitutes the head of a screw threadedly received in said housing.

5. An apparatus as defined in claim 1 wherein said arms are each provided with a surface overlying the respective apertures and extending therebeyond in all operative positions of said arms relative to said wall portion and constituting said shield means.

6. An apparatus as defined in claim 5 wherein said arms are axially displaceably mounted on said crankshaft, said apparatus further comprising resilient means bearing axially upon said arms to urge said surfaces into sliding engagement with said wall portion.

7. An apparatus as defined in claim 1 wherein said wall portion is formed with a channel confronting said blade members for intercepting and diverting liquid foreign matter away from said drive means.

8. An apparatus as defined in claim 7 wherein said channel is arcuate and at least partly surrounds the axis of said blade members.

9. An apparatus as defined in claim 8 wherein said channel opens at its extremities at the periphery of said housing for guiding said liquid foreign matter away from the interior thereof.

10. A disintegument apparatus comprising a housing having a generally elongated handle portion and a blade portion at one end thereof; a pair of peripherally toothed juxtaposed blade disks journaled in said blade portion for relative angular displacement about a common axis extending transversely to said handle portion, said blade portion being formed with a compartment adjacent said disks; a source of motive power mounted in said handle portion and having a drive shaft extending axially therealong; transmission means in said compartment coupling said blade disks with said shaft, said transmission means including a crankshaft journaled in said housing, gear means interconnecting said drive shaft and said crankshaft, and a pair of arms eccentrically articulated to said crankshaft and extending generally parallel to said blade disks on one side thereof; connecting means pivotally linkening each of said arms with a respective one of said disks at locations thereon from their axis and disposed symmetrically with respect to an axial plane thereof; and partition means on the blade portion of said housing interposed between said blade disks and said compartment for preventing entry of foreign matter entrained by said blade disks into contact with said transmission means, said partition means including a wall portion extending generally parallel to said disks intermediate the latter and said arms while being provided with apertures adapted to clear said connecting means.

11. A disintegument apparatus comprising a housing having a generally elongated handle portion and a blade portion at one end thereof; a pair of peripherally toothed juxtaposed blade disks journaled in said blade portion for relative angular displacement about a common axis extending transversely to said handle portion, said blade portion being formed with a compartment adjacent said disks; a source of motive power mounted in said handle portion and having a drive shaft extending axially therealong; transmission means in said compartment coupling said blade disks with said shaft, said transmission means including a crankshaft journaled in said housing for rotation about an axis generally transverse to said drive shaft, gear means including a first bevel gear mounted upon said drive shaft and a second bevel gear mounted on said crankshaft and in mesh with said first bevel gear interconnecting said drive shaft and said crankshaft, and a pair of arms eccentrically articulated to said crankshaft and extending generally parallel to said blade disks on one side thereof; connecting means pivotally linking each of said arms with a respective one of said disks at locations thereon offset from their axis and disposed symmetrically with respect to an axial plane thereof passing through the axis of said crankshaft; and partition means on the blade portion of said housing interposed between said blade disks and said compartment for preventing entry of foreign matter entrained by said blade disks into contact with said transmission means, said partition means including a wall portion extending generally parallel to said disks intermediate the latter and said arms while being provided with apertures adapted to clear said connecting means, said arms each being provided with a shield surface overlying the respective aperture and extending therebeyond in all relative positions of said arms and said wall portion for preventing entry of said foreign matter into said compartment through said apertures.

References Cited by the Examiner

UNITED STATES PATENTS

| | | | |
|---|---|---|---|
| 1,974,557 | 9/34 | Andis | 30—216 |
| 2,650,993 | 9/53 | Brown et al. | 30—216 X |
| 2,751,680 | 6/56 | Wezel | 30—219 |
| 2,766,524 | 10/56 | Dagneau | 30—215 |
| 2,974,413 | 3/61 | Williams | 30—219 |
| 3,079,687 | 3/63 | Jepson | 30—210 |

WILLIAM FELDMAN, *Primary Examiner.*

EDWARD V. BENHAM, *Examiner.*